United States Patent [19]
Sobti et al.

[11] Patent Number: 5,553,315
[45] Date of Patent: Sep. 3, 1996

[54] METHOD OF MAINTAINING ACCESS AUTHORIZATION USING A BULLETIN BOARD COMMUNICATION RESOURCE

[75] Inventors: Arun Sobti; Richard A. Comroe, both of South Barrington, Ill.

[73] Assignee: Motorola, Inc., Schaumburg, Ill.

[21] Appl. No.: 336,367

[22] Filed: Nov. 8, 1994

[51] Int. Cl.[6] .................................................. H04B 7/00
[52] U.S. Cl. ...................... 455/56.1; 455/33.1; 455/54.2
[58] Field of Search .............................. 455/33.1, 38.1, 455/38.2, 38.3, 54.2, 56.1; 340/825.26, 825.27, 825.31, 825.34, 825.44; 379/58, 59

[56] References Cited

U.S. PATENT DOCUMENTS

| | | | |
|---|---|---|---|
| 5,301,359 | 4/1994 | Van den Heuvel et al. | 455/54.1 |
| 5,361,397 | 11/1994 | Wright | 455/38.2 |
| 5,434,563 | 7/1995 | Kudoh | 455/38.2 |
| 5,465,392 | 11/1995 | Baptist et al. | 455/38.3 |

*Primary Examiner*—Reinhard J. Eisenzopf
*Assistant Examiner*—Marsha D. Banks-Harold
*Attorney, Agent, or Firm*—Susan L. Lukasik; Steven G. Parmelee

[57] ABSTRACT

A bulletin board coordinates the service authorization for other communication systems. Service authorizations are periodically updated, with authorized communication units returning to the bulletin board at pre-scheduled times to receive the updates that extend service authorization for authorized communication services. The bulletin board transmits authorization information on known communication resources at predetermined times known only by authorized communication units.

18 Claims, 3 Drawing Sheets

METHOD OF MAINTAINING ACCESS AUTHORIZATION USING A BULLETIN BOARD COMMUNICATION RESOURCE

FIELD OF THE INVENTION

This invention relates generally to communication systems, including but not limited to land mobile radio frequency communication systems.

BACKGROUND OF THE INVENTION

The basic operation and structure of land mobile radio frequency communication systems is known. Land mobile radio communication systems typically comprise one or more radio communication units and one or more repeaters that transceive information via communication resources, also referred to as communication channels, include time slots, frequency pairs and so forth. These communication resources typically reside on narrow spaced channels of various bandwidths, such as 12.5 kHz, 25 kHz, and 30 kHz. Further, these narrow spaced channels are often variously licensed to multiple systems or services within an allocated band. Finally, these bands are often allocated for common narrow-bandwidth channel characteristics which differ with adjacent bands.

Thus, a diverse collection of systems typically simultaneously provide land mobile communications to a common, or overlapping, coverage area. Each system may typically be characterized by different channel characteristics, coverage, and services. Paging and cellular telephony are but two examples of different services provided by different systems with different channel characteristics and system designs.

There is little integration of different systems today. Users typically employ separate distinct radio units for each system, regardless of how close the operating channels are in frequency, which in some cases may even be overlapping. The user further employs a separate and distinct authorization procedure for each system which may vary anywhere from over-the-air transmission, to a land-based telephone call. Also, some services which are one-way only in nature, such as paging, make over-the-air registration impossible.

Due to the necessity for two-way communications, over the air registration is not possible for many radio services. The need for new registration when roaming becomes an inconvenience for many services that require the user to find an alternative communication service to perform a manual registration.

Roaming further presents a plethora of registration and authorization difficulties in that the time duration of roaming service is indeterminate, typically requiring the user to manually invoke a roaming service request each day.

As service theft increases, security of authorization remains a major concern to all communication systems operators and owners. Typical methods of protection involve encryption and authentication of identity codes. Nevertheless, theft of identity and authentication codes can defeat this. Because of the ability of unauthorized users to receive and duplicate codes, encryption becomes necessary to combat the theft of authentication and identity codes that are transmitted over the air. As in almost any security system, the only recourse available to combat an authentication and identity code that has been stolen is to change the codes. Changing codes over-the-air is also known in the art, although such changing procedures are accompanied by ever-increasing complexity to overcome the abilities of the thief to eavesdrop and use codes in an unauthorized manner.

Additionally, reprogramming of communication units on a communication system today is not practical for a variety of technical reasons. Many individual communication systems, such as paging, lack sufficient bandwidth to provide downloading of new programming data without significantly disrupting the prime communication service, i.e., paging. While usage of many or most communication services wanes at night, requiring all communication units to remain active continuously (24 hours) would significantly impact operating characteristics, such as battery life.

Accordingly, there is a need for an simplified method of registration, authorization, and reprogramming for multiple communication services such that automatic over-the-air registration can be performed, as well as over-the-air reprogramming of identity and authorization codes, without impacting unit battery life.

DESCRIPTION OF A PREFERRED EMBODIMENT

Figure 1:
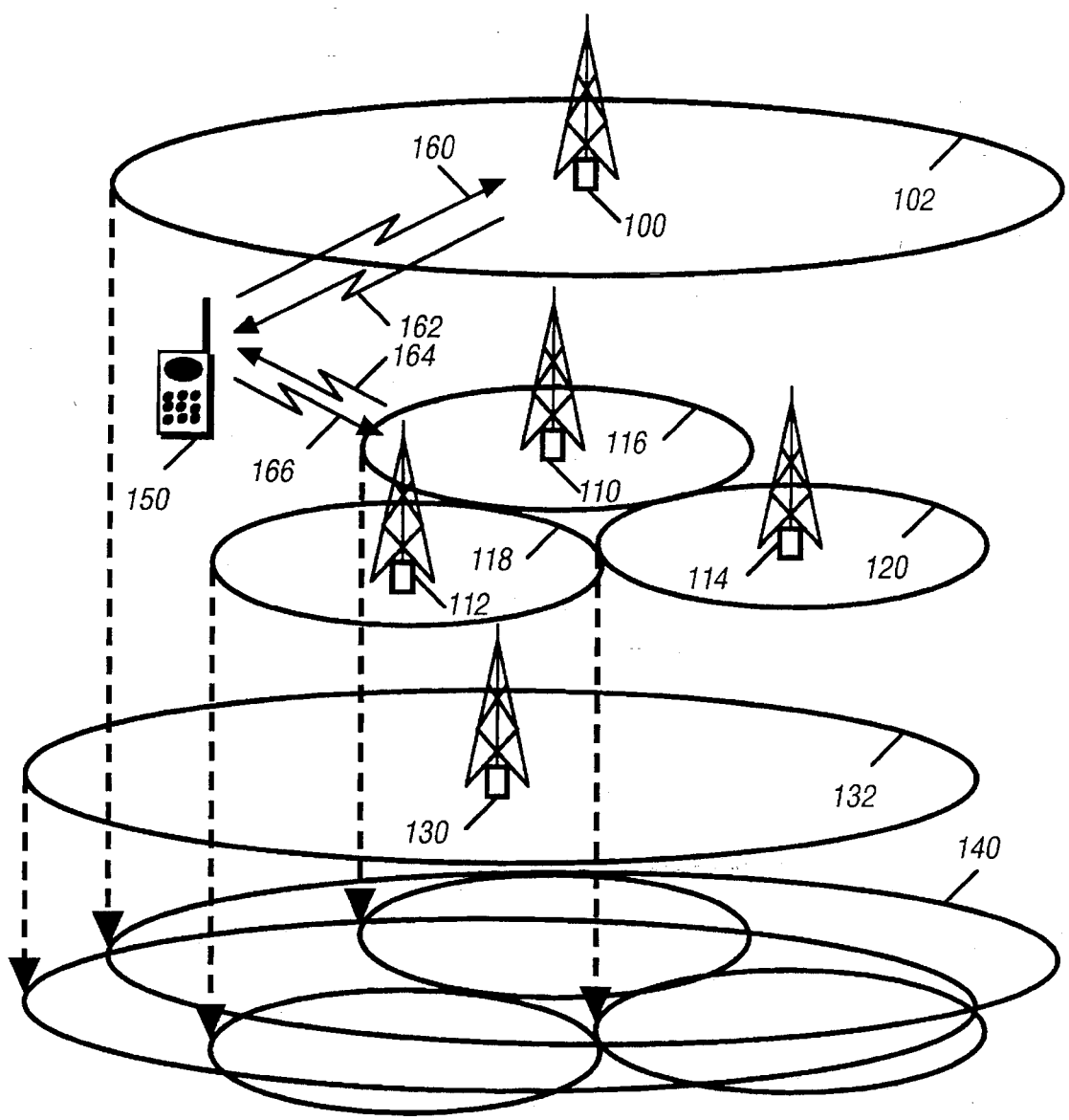
FIG. 1 is a diagram that illustrates a geographic area served by several communication services and coordinated by a common bulletin board in accordance with the invention.

The following describes an apparatus for and method of providing an authorization extension service provided on a radio frequency (RF) bulletin board resource shared by multiple communication systems.

RF bulletin boards are employed to coordinate the activities of multiple radio systems in a given geographic area, among other functions. The RF bulletin board employs its own radio channel resource to distribute information regarding the various radio services available in a given area. Further, RF bulletin boards may serve as a focal point for service registration to any of the coordinated radio services. Further details on RF bulletin boards are provided in U.S. Pat. No. 5,301,359, titled "Bulletin Board Resource for Communication System Access," issued Apr. 5, 1994, assigned to Motorola, Inc., which patent is incorporated herein by reference.

In the present invention, the RF bulletin board further distributes authorization code to registering units. The authorization code assigned over the bulletin board is conveyed to the individual radio service being registered for, which authorization code is further employed by that radio service to insure that service is used by only the registered unit.

In the present invention, the bulletin board regularly repeats the service authorization codes to registered units on a time scheduled basis, such as at off-usage periods during the night. The registered units regularly return to the bulletin board at the scheduled times to receive new authorization codes. When the user turns off a communication unit, the unit would automatically turn on at the scheduled time to receive new authorization codes in order to conserve power.

When a communication unit fails to communicate with a previously valid authorization code, such a condition is conveyed to the communication unit user. At the user's selection, the communication unit may automatically return to the bulletin board to extend service upon detection of an invalid authorization code. Further, the bulletin board would be configured to reject registration requests from users whose service payments were in arrears, as well as communicate to the communication unit the reason for the authorization rejection.

Access authorization to communication services for a radio is maintained using the following method. Communication resources that correspond to the communication services for which the radio has previously gained a service authorization are used. A bulletin board communication resource is accessed to extend the service authorization for at least one of the communication services. The radio then returns to the communication resources for at least the communication service for which service extension was authorized. When shutting off the radio to temporarily discontinue the communication services, a time may be determined to later automatically activate the radio to facilitate accessing the bulletin board communication resource. In addition, the step of accessing the bulletin board communication resource to extend the service authorization for at least one of the communication services may further include the step of receiving an updated authorization code, and the step of returning to the communication resources for at least the communication service for which service extension was authorized may further include the step of using the updated authorization code to gain usage of at least one of the communication resources.

Additionally, the step of accessing the bulletin board communication resource to extend the service authorization for at least one of the communication services may further include the step of receiving, on the bulletin board communication resource, updated operating instructions to allow the radio to properly function with a corresponding communication service, and the updated operating instructions may include functional software code and/or a time at which the updated operating instructions are to be used when using the corresponding communication service. The step of accessing a bulletin board communication resource to extend the service authorization for at least one of the communication services may further include the step of accessing the bulletin board communication resource when denied service on one of the communication services, and such accessing of the bulletin board communication resource may be automatically performed. The step of accessing a bulletin board communication resource to extend the service authorization for at least one of the communication services may further include the step of receiving, on the bulletin board communication resource, information regarding arrears in payments for at least one of the communication services, and the step of accessing a bulletin board communication resource to extend the service authorization for at least one of the communication services may further include the step of satisfying the arrears in payments using the bulletin board communication resource.

In addition, the bulletin board communication resource may be accessed automatically to extend the service authorization for at least one of the communication services, which automatic accessing may further include the step of automatically accessing the bulletin board communication resource at a predetermined time to extend the service authorization for at least one of the communication services. The predetermined time may be received from the bulletin board communication resource. This step of automatic accessing may also include automatically activating the radio to support communications with the bulletin board communication resource.

Alternatively, the method of controlling access authorization to communication services for a radio may be described as follows. Communication resources that correspond to the communication services for which the radio has previously gained a service authorization are used. A bulletin board communication resource is accessed to facilitate control of the service authorization for at least one of the communication services. When service is to be continued, information that facilitates continuation of service to at least one communication service is received from the bulletin board communication resource. When service is to be interrupted, information that provides notification of interruption of service to at least one communication service is received from the bulletin board communication resource. The radio then returns to the communication resources for at least the communication service for which service extension was authorized. In addition, the step of receiving, from the bulletin board communication resource, information that provides notification of interruption of service to at least one communication service may further include receiving, from the bulletin board communication resource, information that facilitates interruption of service to at least one communication service.

A method of maintaining access authorization to at least one radio communication service that is supported by a first radio communication system for a two-way radio may also be described as follows. At least one radio communication resource that corresponds to the at least one radio communication service for which the two-way radio has previously gained a service authorization is used. A bulletin board communication resource is accessed to continue the service authorization of the two-way radio for the at least one radio communication service, wherein the bulletin board communication resource is supported by a second radio communication system, which second radio communication system is separate from the first radio communication system. The two-way radio then returns to at least one radio communication resource for which service continuation was authorized.

FIG. 1 illustrates an area served by multiple communication systems and an RF bulletin board. The RF bulletin board (100) provides bulletin board service to a first coverage area (102). Another communication system is depicted served by three sites (110, 112, and 114), providing RF coverage to corresponding coverage areas (116, 118, and 120). Another radio system is also depicted (130) with its corresponding coverage area (132). These radio systems (110, 112, 114, and 130) as well as others may serve overlapping geographic areas (140), which geographic area is also common with the RF bulletin board's (100) coverage area (102).

In the preferred embodiment, a wide area (200) covered by many geographically distributed radio systems each covering a smaller cover area (202, 204, and 206) utilizes multiple RF bulletin boards (208, 210, and 212) to cover the same wide area. Bulletin board coordination with radio systems in the same geographic area are accomplished through multiple communication paths (214). The communication paths (214) between the bulletin board (208, 210, 212) and the base stations in the communication systems' coverage areas (202, 204, 206) may be wireline communication resources or RF communication resources. Coordination for roaming radios is accomplished through communication paths (216) between geographically distributed bulletin boards (208, 210, and 212).

Figure 2:
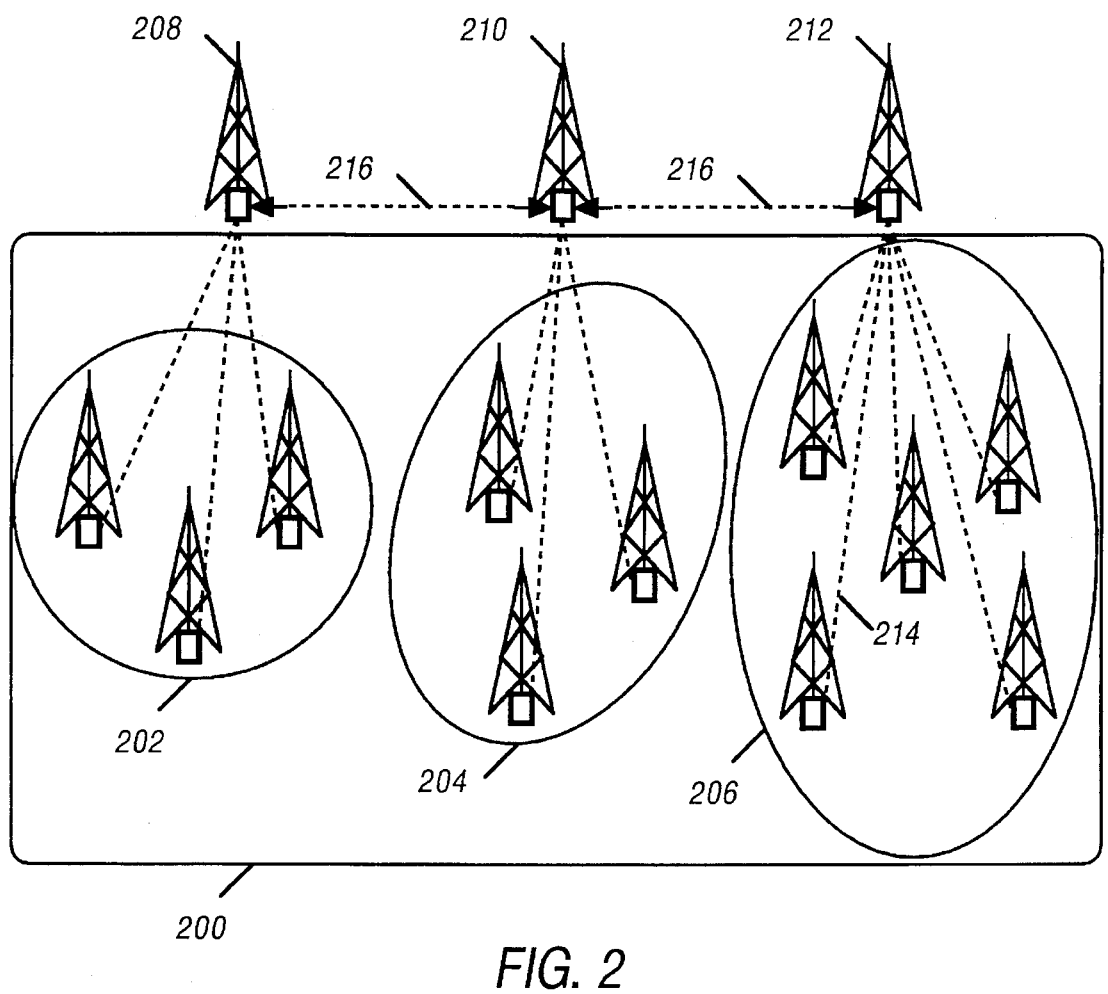
FIG. 2 is a diagram that illustrates a wide geographic area served by multiple, geographically distributed, interconnected bulletin board resources in accordance with the invention.
Figure 3:
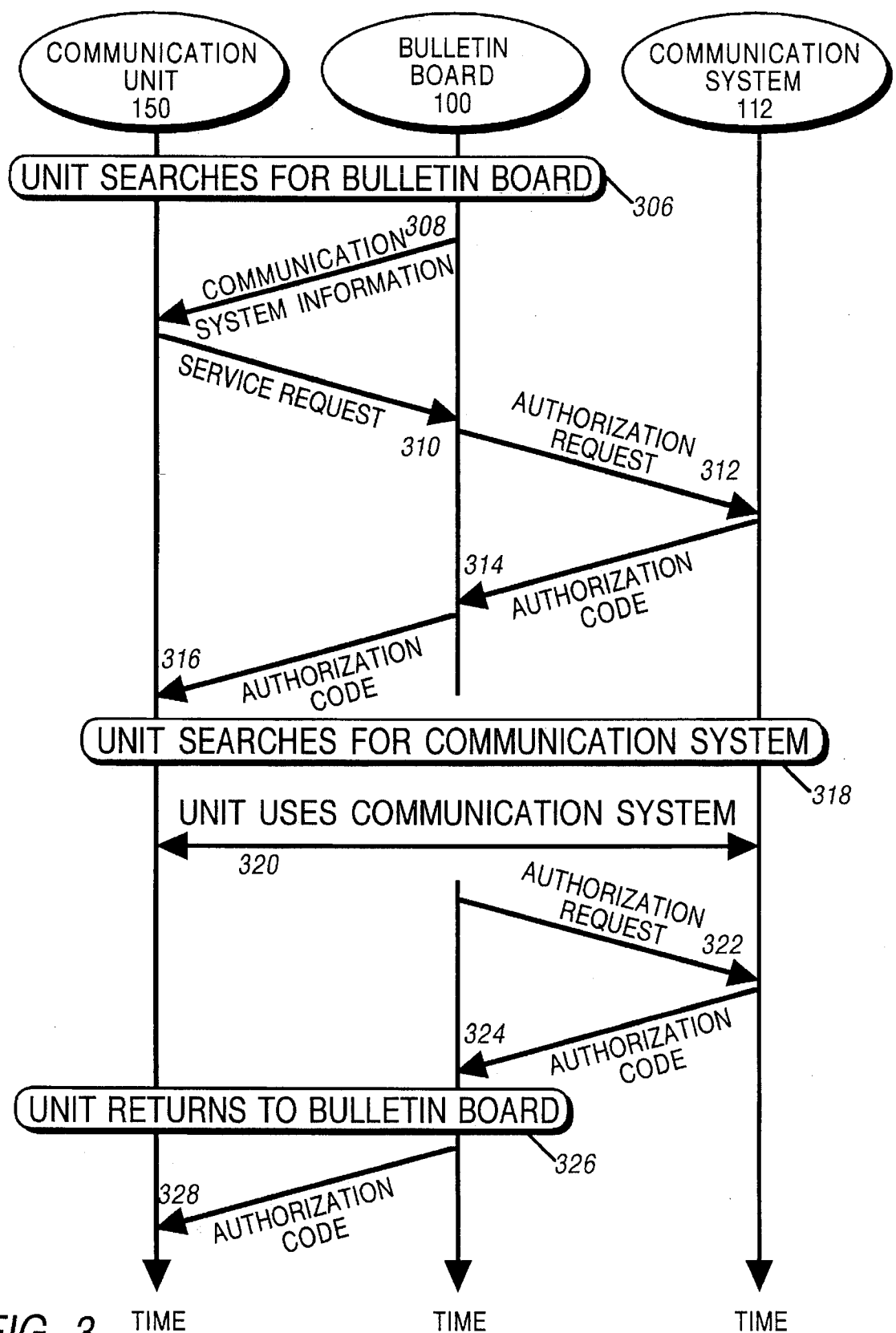
FIG. 3 is a transaction flow diagram that illustrates timing and message flow associated with scheduled authentication code updating in accordance with the invention.

A transaction flow diagram that illustrates timing and message flow associated with scheduled authentication code updating is shown in FIG. 3. The events of the transaction flow diagram will now be described as they relate to the structures of FIG. 1 and FIG. 2. A communication unit (150) is shown in FIG. 1. The communication unit (150), such as a two-way mobile or portable radio, typically begins operation within a new geographic area by searching for and locating (306) the bulletin board (100) serving the area (102) in which the communication unit (150) currently resides. The bulletin board (100) periodically broadcasts (transmits) (308) information (162) identifying communication systems (110, 112, 114, and 130) active within the bulletin board service area (102).

If the user so directs his communication unit (150) to register for service on any of these systems (such as the system covered by sites 110, 112, and 114), a registration request (160), also known as a service request, is transmitted (310) to the bulletin board (100). Having received the user registration request, the bulletin board (100) communicates (312, and 314) with the system (110, 112, and 114) where service has been requested via a communication path (214) as depicted in FIG. 2. In particular, the bulletin board (100) transmits (312) an authorization request along a communication path (214) to a communication system (e.g., the system at site 112). The requested communication system then determines if the communication unit (150) is authorized to use communication services provided by the communication system at any of its sites (112). If the communication unit (150) is authorized, an authorization code is transmitted (314) from the site (112) to the bulletin board (100). Communications with other bulletin boards (208, 210, and 212) may also be necessary if the user has associated billing with another bulletin board, via a communication path (216) between bulletin boards (208, 210, and 212). Having insured that the user's billing payments are not in arrears, a valid authentication code (162) is transmitted (316) to the communication unit (150) from the bulletin board (100), allowing the communication unit (150) to operate on the requested system at any of its sites (110, 112, and 114). Methods of securing the authentication codes from all but the requesting communication unit (150) are well known in the art. Along with the authentication code, and based upon the length of service requested, the bulletin board (100) also transmits (316) to the communication unit (150) a scheduled time (162) for an authentication code update.

Having received authentication codes and information on the other communication system's sites (110, 112, and 114), the communication unit (150) searches (318) for and attempts communication with the other communication system's sites (110, 112, and 114). Locating transmissions (164) from one of the sites (112), the communication unit (150) may, at the user's directive, engage (320) in communications (166) within that system.

Prior to the pre-scheduled time, the bulletin board (100) sends (322) an authorization request and obtains (324) a new authentication code from one (112) of the other communication system's sites (110, 112, 114). At the prescheduled time, the communication unit (150) begins monitoring (326) transmissions (162) from the bulletin board (100) in order to automatically receive updated authentication codes transmitted (328) by the bulletin board (100). In the event that the communication unit (150) has been turned off, a timer scheduled with the appointed authentication code update time automatically re-activates the communication unit (150) so that it is powered-up to receive the updated authentication codes transmitted (328) by the bulletin board (100).

Any number of techniques may be employed in the scheduling of authentication code update times to accommodate communication units that are still actively engaged in communications at the time of the authentication code update, as well as accommodating the event that the communications update is not received successfully. Automatically repeating authentication code updates as well as requests from the communication unit (150) to repeat the authentication code updates may be employed.

In the event that an authentication code update is not updated, such as when the user requested service duration has elapsed, any request (166) by the communication unit (150) would be responded to (164) by the communication system (112) with denial of service. If the user has directed his communication unit (150) to request service be extended, the process would essentially repeat automatically from the point (306) when the communication unit (150) originally accessed the bulletin board (100) to request service.

According to this invention, registration for any of a plurality of communications systems may be usefully coordinated by a bulletin board system. Communication device users benefit by being permitted to register for usage of any coordinated communication system for any amount of time without the complication of registration methods that are unique or different from each system, or registration methods that are either permanent (needing to then be cancelled) or automatically self-expiring on a repetitive basis (daily, weekly, or otherwise) and thus requiring the user to re-register continually to maintain the desired length of registration service. Communication systems providers benefit by virtue of automatically managed authorization code updating such that codes may be limited in authorized duration, which helps to minimize service fraud. Authorization code updating need only be performed by the bulletin board system rather than each system on its own, which simplifies the design of the various coordinated communication systems. Also, by having only one system perform authorization code updating, it can be designed with the highest over-the-air security methodology. Finally, the pre-scheduled authentication updating process permits communication units to power-down at the user's discretion, such that portable battery demands are not increased unnecessarily.

What is claimed is:

1. A method of maintaining access authorization of communication services for a radio, comprising the steps of:

using communication resources that correspond to the communication services for which the radio has previously gained a service authorization;

accessing a bulletin board communication resource to extend the service authorization for at least one of the communication services;

receiving, from the bulletin board communication resource, an authorization code corresponding to the at least one of the communication services; and returning to the communication resources for at least the communication service for which service extension was authorized.

2. The method of claim 1, further including the step of, when shutting off the radio to temporarily discontinue the communication services, determining a time to later automatically activate the radio to facilitate accessing the bulletin board communication resource.

3. The method of claim 1, wherein the step of accessing the bulletin board communication resource to extend the service authorization for at least one of the communication services further includes the step of receiving an updated authorization code.

4. The method of claim 3, wherein the step of returning to the communication resources for at least the communication service for which service extension was authorized further includes the step of using the updated authorization code to gain usage of at least one of the communication resources.

5. The method of claim 1, wherein the step of accessing the bulletin board communication resource to extend the service authorization for at least one of the communication services further includes the step of receiving, on the bulletin board communication resource, updated operating instructions to allow the radio to properly function with a corresponding communication service.

6. The method of claim 5, wherein the updated operating instructions include functional software code.

7. The method of claim 5, wherein the updated operating instructions include a time at which the updated operating instructions are to be used when using the corresponding communication service.

8. The method of claim 1, wherein the step of accessing a bulletin board communication resource to extend the service authorization for at least one of the communication services further includes the step of accessing the bulletin board communication resource when denied service on one of the communication services.

9. The method of claim 8, wherein the step of accessing the bulletin board communication resource when denied service on one of the communication services further includes the step of automatically so accessing the bulletin board communication resource.

10. The method of claim 1, wherein the step of accessing a bulletin board communication resource to extend the service authorization for at least one of the communication services further includes the step of receiving, on the bulletin board communication resource, information regarding arrears in payments for at least one of the communication services.

11. The method of claim 10, wherein the step of accessing a bulletin board communication resource to extend the service authorization for at least one of the communication services further includes the step of satisfying the arrears in payments using the bulletin board communication resource.

12. The method of claim 1, further including the step of automatically accessing the bulletin board communication resource to extend the service authorization for at least one of the communication services.

13. The method of claim 12, wherein the step of automatically accessing the bulletin board communication resource to extend the service authorization for at least one of the communication services further includes the step of automatically accessing the bulletin board communication resource at a predetermined time to extend the service authorization for at least one of the communication services.

14. The method of claim 13, further including the step of receiving from the bulletin board communication resource the predetermined time.

15. The method of claim 12, wherein the step of automatically accessing the bulletin board communication resource to extend the service authorization for at least one of the communication services further includes the step of automatically activating the radio to support communications with the bulletin board communication resource.

16. A method of controlling access authorization to communication services for a radio, comprising the steps of:

using communication resources that correspond to the communication services for which the radio has previously gained a service authorization;

accessing a bulletin board communication resource to facilitate control of the service authorization for at least one of the communication services;

when service is to be continued, receiving, from the bulletin board communication resource, information that facilitates continuation of service to at least one communication service, wherein the information comprises at least an authorization code;

when service is to be interrupted, receiving, from the bulletin board communication resource, information that provides notification of interruption of service to at least one communication service; and returning to the communication resources for at least the communication service for which service extension was authorized.

17. The method of claim 16, wherein the step of receiving, from the bulletin board communication resource, information that provides notification of interruption of service to at least one communication service further includes the step of receiving, from the bulletin board communication resource, information that facilitates interruption of service to at least one communication service.

18. A method of maintaining access authorization to at least one radio communication service that is supported by a first radio communication system for a two-way radio, comprising the steps of:

using at least one radio communication resource that corresponds to the at least one radio communication service for which the two-way radio has previously gained a service authorization;

accessing a bulletin board communication resource, which bulletin board communication resource is supported by a second radio communication system, which second radio communication system is separate from the first radio communication system, to continue the service authorization of the two-way radio for the at least one radio communication service;

receiving, from the bulletin board communication resource, an authorization code corresponding to the at least one radio communication service; and returning to at least one radio communication resource for which service continuation was authorized.

* * * * *